Dec. 12, 1939.  W. R. JENKINS  2,183,480
ANIMAL TONGS
Filed Aug. 4, 1937
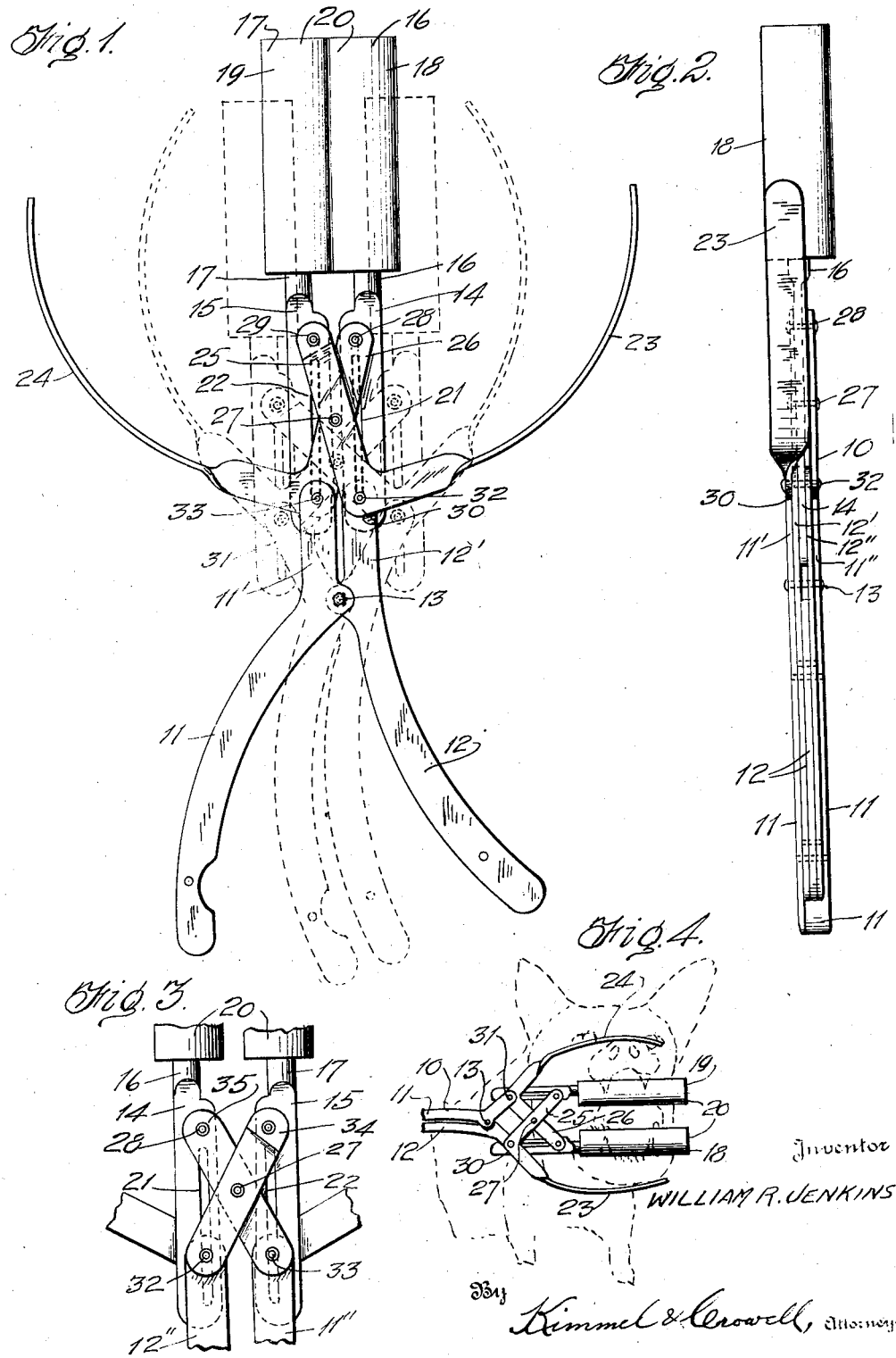
Inventor
WILLIAM R. JENKINS
By Kimmel & Crowell, Attorneys Patented Dec. 12, 1939

2,183,480

UNITED STATES PATENT OFFICE 2,183,480

ANIMAL TONGS

William Reginald Jenkins, Charlottetown, Prince Edward Island, Canada, assignor of one-half to Preston W. Ellis, Summerside, Prince Edward Island, Canada Application August 4, 1937, Serial No. 157,436
In Canada August 7, 1936

2 Claims. (Cl. 128—14)

This invention relates to devices for opening and retaining open the jaws of animals and more particularly to so-called pilling tools for foxes.

In fox breeding particularly, breeders frequently find it necessary to administer medicines, which are essential particularly at certain seasons of the year. The medicines used are chiefly in the form of pills and great difficulty is experienced in forcing the fox to swallow them and in avoiding injury to valuable animals. For the purpose of administering the medicine, it is necessary to provide an instrument for opening and holding open the mouth of the animal. Up to the present time a number of tools have been devised for this purpose, but one main difficulty has been that the tools have been complicated and they have been so constructed that the animal's jaws have been gripped from the front by means of a tool which extends out in the front of the mouth and head, so that they constitute an obstacle to the administering of the medicine and make it impossible to see into and examine the mouth or throat. Moreover, there is always a great risk in administering pills that they will enter the windpipe and many foxes are lost annually in consequence.

It is apparent therefore that the instruments of the prior art as described not only constitute an obstacle to administering the medicine, but also make it impossible to see whether it has gone down the animal's throat. Furthermore, as in the case of administering medicines without the use of tools, two men are needed to perform the operation.

According to the present invention, there is provided a tool for opening and retaining the jaws of animals which generally consists of a tong structure including handles and a bit formed in two separable sections operably connected with the handles and having their longitudinal axis extending in the plane of the handles together with clamping jaws disposed on each side of the bit which are responsive to the operation of the bit sections to clamp the jaws of the animal when the bit sections are separated, so that the jaws of the animal may be opened and securely retained in open position through a simple operation carried out by a tool held in one hand of the operator, the other hand being left free to administer medicines.

A salient feature consists in the fact that since the longitudinal axes of the bit are in the same plane as the handle, the tool is held to the side of the animal's head and when the jaws are separated there is no obstruction at the front of the head to provide an obstacle to the administering of the medicine or to the inspection of the animal's mouth and throat, all parts of which being so held as to be clearly in view.

The invention will be apparent from a consideration of the following detailed specification, taken in conjunction with the accompanying drawing in which Figure 1 is a side elevation of the tool in normal position, showing the bit sections disposed adjacent to each other or in abutting relation and the clamping jaws spread apart, the position of the parts when the tool is operated to open and clamp the jaws of an animal being shown in dotted lines.

Figure 2 is a side elevation of Fig. 1, and

Figure 3 is a fragmentary detail of the reverse side of the tool showing the varied toggle connection formed on that side of the tool. Figure 4 is a view showing the application of the device in the treatment of an animal.

Referring to the drawing, 10 indicates the tool as a whole which might generally be described as a tong structure formed with handles 11 and 12 which are pivoted together as at 13 so that they may be drawn together or spread apart to operate the tool according to requirements. The tool includes two preferably flat shanks 14 and 15, the outer ends 16 and 17 of which are preferably cylindrical and each carry respectively sections 18 and 19 of a bit 20. The bit sections are preferably of rubber or a yieldable material and may constitute sections of rubber hose slipped over the ends 16 and 17 in a relatively secure manner. The shanks 14 and 15 are slotted as at 21 and 22, the handles 11 and 12 being connected to the shanks by way of these slots.

The tool also includes a pair of gripping jaws 23 and 24 which are designed to cooperate with the bit sections 18 and 19 and move responsively to movement of the bit sections. The jaws are curved to grip the jaws of the animal in an efficient manner and a connecting portion is provided preferably twisted to extend in a plane substantially at right angles to the general plane of the material forming the jaws, the connecting portion having arms 25 and 26 bent or otherwise projected substantially at right angles to that part of the connecting portion from which the jaws extend so that by pivotally connecting the arms 25 and 26 as at 27 and pivotally connecting the ends of the arms 25 and 26 to the shanks 14 and 15 by means of the pins 28 and 29, which extend through holes in the shanks disposed above the end of the slots, a toggle mechanism is provided. In this connection it is pointed out that the ends of the handles are pivoted to the connection portion of the jaws adjacent the points 30 and 31 where they are bent or otherwise disposed at substantially right angles to the other parts of the jaw structure, the pivotal connection being by means of the pins 32 and 33 which extend through the slots 21 and 22.

It might here be pointed out that the upper ends 11 and 12 of the handles 11 and 12 are preferably bifurcated as at 11 and 12 so that parts thereof extend on each side of the shanks 14 and 15 and on the opposite side of the tool so that where the jaws are connected, toggle links 34 and 35 are disposed, the lower ends of which pivotally connect with the inner ends 11 and 12 of the handles projecting on that side, connection being effected by the pivot pins 32 and 33, the toggle links being pivoted at their center by the pivot pin 27, while at their opposite ends they are pivoted to the shanks by means of pivot pins 28 and 29, thus, a well balanced and strong structure is produced.

In operation the tool is disposed as shown in full lines in Fig. 1 with the bit pieces 18 and 19 together and the gripping jaws 23 and 24 spread widely apart. The bit 20 composed of two sections 18 and 19 is then disposed in front of the fox's nose, the tool being held at a point to one side of the head. The fox will instinctively bite the bit whereupon the handles 11 and 12 of the tool are immediately compressed together, causing the bit sections 18 and 19 to spread apart, as shown in dotted lines in Fig. 1, and in full lines in Fig. 4, and the jaws 23 and 24 to move towards each other at a point where they are disposed very close to the separated bit sections and thus firmly clamping the animal's jaws by reason of the fact that they encircle the outer parts of the jaws. This clamping action is immediately effected on drawing the handles 11 and 12 together by reason of the fact that the arms 25 and 26 and the corresponding links 34 and 35 on the other side of the tool are pivoted to swing about the stationary pivot pins 28 and 29, while the ends of the handles and the opposite ends of the toggle links on the opposite side of the tool are pivotally connected by the movable pivot pins 32 and 33 which slide in the slots 21 and 22 of the shanks, occasioned by the fact that the arms 25 and 26 and the toggle links 34 and 35 on the opposite sides of the tool are pivoted intermediate their length by the pivot pin 27. Thus the arms 25 and 26 and the toggle links 34 and 35 form a toggle structure which acts to spread apart or bring together the sections 23 and 24 of the bit 20 and cause the jaws 23 and 24 to move responsive to movement of the bit sections.

It will be apparent that in effect the shanks 14 and 15 and their outer ends 16 and 17 are coextensive with the handles and the longitudinal axes of the bit sections 18 and 19 are disposed in the plane of the handles so that as a result the tool may be held to one side of the head of the animal, i. e., in a plane transverse to the animal's head, and when the animal's jaws are clamped in open position, a clear view of the mouth and throat of the animal is provided without any obstruction and there is no danger of obstructing the windpipe, while administering medicine. Furthermore, it is apparent that there is less danger of disturbing and injuring a nervous animal when compared with tools that are operated from the front of the animal's head.

The sections of bit 20, of course, are made of a relatively yieldable material so that they will not injure the animal's teeth and it will be apparent that the covering is such that it can readily be removed when worn and replaced.

The tool as clearly seen from the illustrations is simple in construction, is not bulky and may be manufactured economically.

Although a preferred embodiment of this invention is shown and described, variations within the true spirit and scope of the same are to be determined by the appended claims.

I claim:

1. A tongs comprising a pair of handles pivotally secured together, a pair of parallel jaw members, a slotted shank carried by each jaw member, a pivot carried by each handle slidable in a slot of a shank, a pair of clamping members pivotally carried one by each handle, a substantially right angularly disposed extension integral with a clamping member, means pivotally securing said extensions together intermediate the ends thereof, and a pivot carried by each extension slidable in a slot of a shank whereby to coact with said first pivots in maintaining said jaw members in parallel relation upon rocking of said handles.

2. A device for opening and retaining open the jaws of animals comprising a pair of relatively movable bit members, a pair of relatively movable jaw clamping members pivotally secured to said bit members and to each other, said bit members having slots therein, and a pair of handles pivotally secured to each other and to said clamping members, said last named pivots arranged to slide in said slots.

WILLIAM REGINALD JENKINS.